(12) United States Patent
Thielman

(10) Patent No.: US 9,817,406 B1
(45) Date of Patent: Nov. 14, 2017

(54) SPHERICAL PNEUMATIC ACTUATED ROBOTIC COMMUTER

(71) Applicant: Gerhard W. Thielman, Fredericksburg, VA (US)

(72) Inventor: Gerhard W. Thielman, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/877,952

(22) Filed: Oct. 8, 2015

(51) Int. Cl.
| | |
|---|---|
| *G05D 1/08* | (2006.01) |
| *F03G 3/00* | (2006.01) |
| *B62D 57/00* | (2006.01) |
| *F03G 3/08* | (2006.01) |
| *G05D 1/00* | (2006.01) |

(52) U.S. Cl.
CPC ............ *G05D 1/0891* (2013.01); *B62D 57/00* (2013.01); *F03G 3/00* (2013.01); *F03G 3/08* (2013.01); *G05D 1/0011* (2013.01); *Y10S 901/01* (2013.01)

(58) Field of Classification Search
CPC ...... G05D 1/0891; G05D 1/0011; F03G 3/00; F03G 3/08; B62D 57/00; Y10S 901/01
See application file for complete search history.

(56) References Cited

U.S. PATENT DOCUMENTS

| | | | |
|---|---|---|---|
| 1,915,886 A | 6/1933 | Gutierrez | |
| 2,107,766 A | 2/1938 | Rose | 180/10 |
| 2,267,254 A * | 12/1941 | Reilley | B60F 3/00 |
| | | | 180/21 |
| 3,350,065 A | 10/1967 | Mankey | |
| 3,428,015 A | 2/1969 | Cloud | 441/78 |
| 3,905,323 A | 9/1975 | Kacere | 114/39.23 |
| 4,386,787 A | 6/1983 | Maplethorpe et al. | 280/206 |
| 4,438,588 A | 3/1984 | Martin | 48/228 |
| 4,729,446 A | 3/1988 | Sefton | 180/21 |
| 5,439,408 A * | 8/1995 | Wilkinson | A63H 33/005 |
| | | | 446/409 |
| 6,289,263 B1 | 9/2001 | Mukherjee | 700/245 |
| 6,298,934 B1 | 10/2001 | Shteingold | 180/10 |

(Continued)

*Primary Examiner* — Thomas Ingram
(74) *Attorney, Agent, or Firm* — Gerhard W. Thielman, Esq.

(57) ABSTRACT

A spherical modular autonomous robotic traveler (SMART) is provided for rolling along a surface from a first position to a second position. The SMART includes an outer spherical shell; an inner spherical chamber disposed within the outer shell; a plurality of weight-shifters arranged within the inner chamber; and a controller therein. The chamber maintains its orientation relative to the surface by a gyroscopically homing stabilizer. Each weight-shifter includes a mass disposed in a default position, and movable to an active position in response to activation. The controller selectively activates a weight-shifter among the plurality to shift the mass from the default position to the active position. The outer shell rolls in a direction that corresponds to the weight-shifter activated by the controller. The weight-shifters for the SMART employ pneumatic actuation as a spherical pneumatic actuated robotic commuter (SPARC). Each weight-shifter in the SPARC includes a conduit containing a liquid armature and a pressure source with valves activated by the controller, with the conduits arranged in a cruciform configuration.

20 Claims, 11 Drawing Sheets

(56) References Cited

U.S. PATENT DOCUMENTS

| | | | |
|---|---|---|---|
| 7,767,335 B2 | 8/2010 | Sharrow et al. | 429/156 |
| 7,963,350 B1 | 6/2011 | Thielman et al. | 180/7.1 |
| 8,322,471 B2 | 12/2012 | Schroll | 180/54.1 |
| 8,672,062 B2 | 3/2014 | Schroll | 180/8.1 |
| 8,768,548 B2 | 7/2014 | Thielman | 701/22 |
| 9,152,148 B1 | 10/2015 | Thielman | 701/22 |
| 2012/0316701 A1* | 12/2012 | Thielman | B62D 57/00 701/2 |
| 2015/0224941 A1* | 8/2015 | Bernstein | G05D 1/0022 180/167 |
| 2016/0291591 A1* | 10/2016 | Bernstein | G05D 1/0011 |

* cited by examiner

SPHERICAL PNEUMATIC ACTUATED ROBOTIC COMMUTER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

CROSS REFERENCE TO RELATED APPLICATION

The invention is a Continuation-in-Part of, claims priority to and incorporates by reference in its entirety U.S. Pat. No. 9,272,743 assigned Navy Case 103301. That parent application is a Continuation-in-Part of U.S. Pat. No. 9,152,148, which is a Continuation of U.S. Pat. No. 8,768,548, which is a Continuation-in-Part of U.S. Pat. No. 7,963,350, all of which are incorporated by reference in their entireties.

BACKGROUND

The invention relates generally to autonomous robots. In particular, the invention relates to spherical self-propelled robots for autonomous remote locomotion by rolling along an external surface.

Autonomous robots have been developed for various purposes, including self-propelled machines designed for locomotion along horizontal and uneven surfaces. Additionally spherical platforms designed for ferrying persons into hostile close-quarter areas for reconnaissance, e.g., U.S. Pat. No. 7,963,350 and for remote-control infrared sensing, e.g., U.S. Pat. No. 8,768,548, have been conceptualized. These involve lower and upper internal carriages equipped with wheels that rotate along an outer shell of the platform to induce vehicle translation along the external surface.

Alternative ball-shaped robots include U.S. Pat. No. 6,289,263 to Mukherjee and U.S. Pat. No. 8,322,471 to Schroll. The former concept provides a central hub with spokes extending radially therefrom and masses that shift along the spokes to shift the robot's moment of inertia for locomotion. The latter concept employs a pair of counter-rotating gyroscopes to imparting momentum to a spherical housing.

SUMMARY

Conventional autonomous robots yield disadvantages addressed by various exemplary embodiments of the present invention. In particular, a spherical modular autonomous robotic traveler (SMART) is provided for rolling from a first location to a second location along a surface. Three particular configurations are described based on weight-shifting mode of actuation, including electromagnetic, pneumatic and scissors mechanisms.

The first configuration described corresponds to a spherical electro-magnetically initiated traveling excursor (SEMITE) and substantially described in U.S. Pat. No. 9,272,743. The second configuration can be characterized as a liquid metal transported through conduits into reservoirs for inertial shifting using pressurized gas. This version is labeled a spherical pneumatic actuated robotic commuter (SPARC). Both configurations employ inner and outer spherical spheres, the outer sphere for rolling on a surface, and the inner sphere to adjust the SMART's center of mass for locomotion while remaining substantially upright. Both configurations can optionally mount counter-rotating disks within the inner sphere as a gyroscopically homing stabilizer (GHoSt). The third configuration employs a single sphere with alternating scissors actuators to extend or retract weights for shifting the center of mass to roll the sphere. This version is labeled a spherical weight-shifting integral free-rolling tumbler (SWIFT).

Various exemplary embodiments provide a SMART that includes an outer spherical shell for rolling along the surface, an inner spherical chamber within the outer shell to carry the payload, a plurality of weight-shifters arranged in the inner chamber, and a controller to activate a select weight-shifter among the plurality. The outer shell rolls in a direction that corresponds to the activated weight-shifter by torque induced thereby. The inner chamber maintains its orientation relative to the surface by counter-rotating gyros, even while the outer shell rolls along the surface. The weight-shifters can be arranged symmetrically or asymmetrically.

In exemplary embodiments such as a SEMITE, each weight-shifter includes a channel containing an armature and an electromagnet activated by the controller. For a symmetrical (i.e., neutral) SEMITE such as a cruciform configuration, the channel is oriented from bottom periphery to lateral radial periphery of the inner chamber. The electromagnet is disposed proximal to the channel at the lateral radial periphery. The armature travels from the bottom periphery within the channel to the lateral radial periphery upon activation of the electromagnet.

Alternate embodiments provide an asymmetrical (i.e., biased) SEMITE that incorporates a peripheral weight-shifter including a rim adjacent channel containing a first armature oriented from a forward periphery of the inner chamber toward a circumferential periphery of the inner chamber; a radial weight-shifter including a radial channel containing a second armature oriented from the forward periphery toward an interior location. The weight-shifters further include first and second electromagnets activated by the controller respectively disposed adjacent the circumferential periphery and the interior location. The first armature travels from the forward periphery within the peripheral channel to the circumferential periphery upon activation of the first electromagnet, and the second armature travels from the forward periphery within the radial channel to the interior location upon activation of the second electromagnet.

In other exemplary embodiments, such as a SPARC, each weight-shifter includes a conduit containing a liquid armature and a pressure source with valves activated by the controller, with the conduits arranged in the cruciform configuration. Each conduit is oriented from bottom periphery to lateral radial periphery of the inner chamber. The pressure source is disposed along the centerline vertical axis. The armature travels pneumatically upward from the bottom periphery within the conduit to the lateral radial periphery upon opening of the corresponding valve.

In various exemplary embodiments, the SEMITE and SPARC configurations incorporate a gyroscopically homing stabilizer (GHoSt) for maintaining the inner chamber in an upright orientation, even while the outer shell rolls along the surface. The GHoSt includes counter-rotating flywheel disks spun to provide reaction torque for the inner chamber.

In yet other exemplary embodiments, the SWIFT incorporates a single spherical shell that contains a box fixed in the sphere's center at its corners to the shell's interior. Each face side of the box operates a weight-shifting mechanism that extends a weight from the box to the shell's periphery and subsequently retracts the weight as the shell rolls on the surface. The box includes control processors and sensors to indicate which faces are oriented upward or downward in relation to the surface.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

The disclosure generally employs metric units with the following abbreviations: length in centimeters (cm) or meters (m), mass in grams (g) or kilograms (kg), time in seconds (s), angles in degrees)(° or radians (rad), force in newtons (N) and current in amperes (A). Supplemental measures can be expressed derived from these, such as density in grams-per-cubic-centimeters ($g/cm^3$), moment of inertia in gram-square-centimeters ($kg-m^2$) and the like.

U.S. Pat. Nos. 7,963,350 and 8,768,548 represent self-locomotive spherical platforms that employ dual wheeled carriages mounted under and over the payload carriage contained within an outer spherical shell. (The former reference includes description of personnel seated in tandem, whereas this adjective should have been corrected to being abreast.) Exemplary embodiments of the spherical modular autonomous robotic traveler (SMART) incorporate controlled shifts of the center of mass to minimize moving components and thereby enable miniaturization of such a self-propelled device to approximately the size of a croquet ball that has a regulation diameter of 3⅝ inches (9.2 cm). A billiard ball of 5.7 cm (2.244 inches for American pool) could represent an alternative size for such purposes. For the SEMITE version, the SMART can be designed with inertial momentum that is either neutral or biased, depending on static preference of being either stationary or rolling. These alternatives are respectively labeled n-SEMITE (for neutral) and b-SEMITE (for biased).

Figure 1:
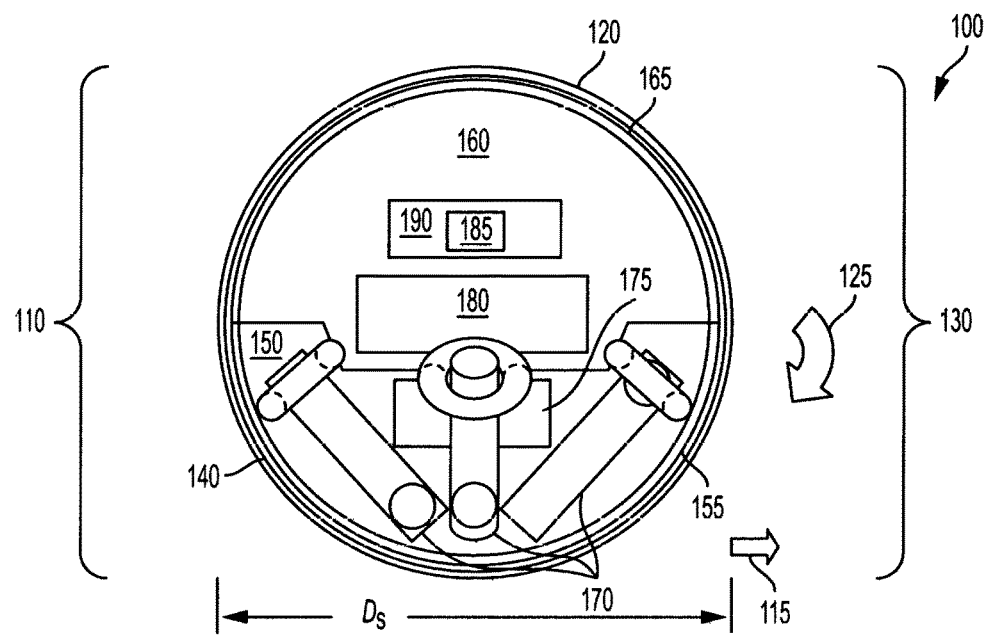
FIG. 1 is an elevation view of a neutral electromagnetic spherical traveler assembly.

FIG. 1 shows an elevation cross-section view 100 of an exemplary neutral SEMITE 110 for travel in direction arrow 115. An outer shell 120 provides the rolling exterior surface that rotates on a flat surface in a rolling arrow direction 125 and contains an inner non-rotating ball 130. A lubrication layer 140 interposes between the rolling outer shell 120 and the inertial inner ball 130 to reduce friction. The inner ball 130 includes a lower locomotion module 150 encased by a lower dome 155 and an upper payload module 160 encased by an upper dome 165.

The lower module 150 includes a plurality 170 of weight-shifting modules and a control assembly 175. The upper module 160 includes a designated payload 180, such as an incendiary, explosive or flash-bang charge equipped with a trigger 185 within a housing 190. (For non-military purposes, the payload 180 can include flashing lights and/or an acoustic noise emitter, or related amusement distraction.) For travel along arrow 115, the outer shell 120 rolls clockwise by the arrow 125 along a smooth frictional surface substantially perpendicular to the local gravitational field, while the inner ball 130 maintains an upright orientation (relative to that field and thereby the surface) during travel of the SEMITE 110.

Figure 2:
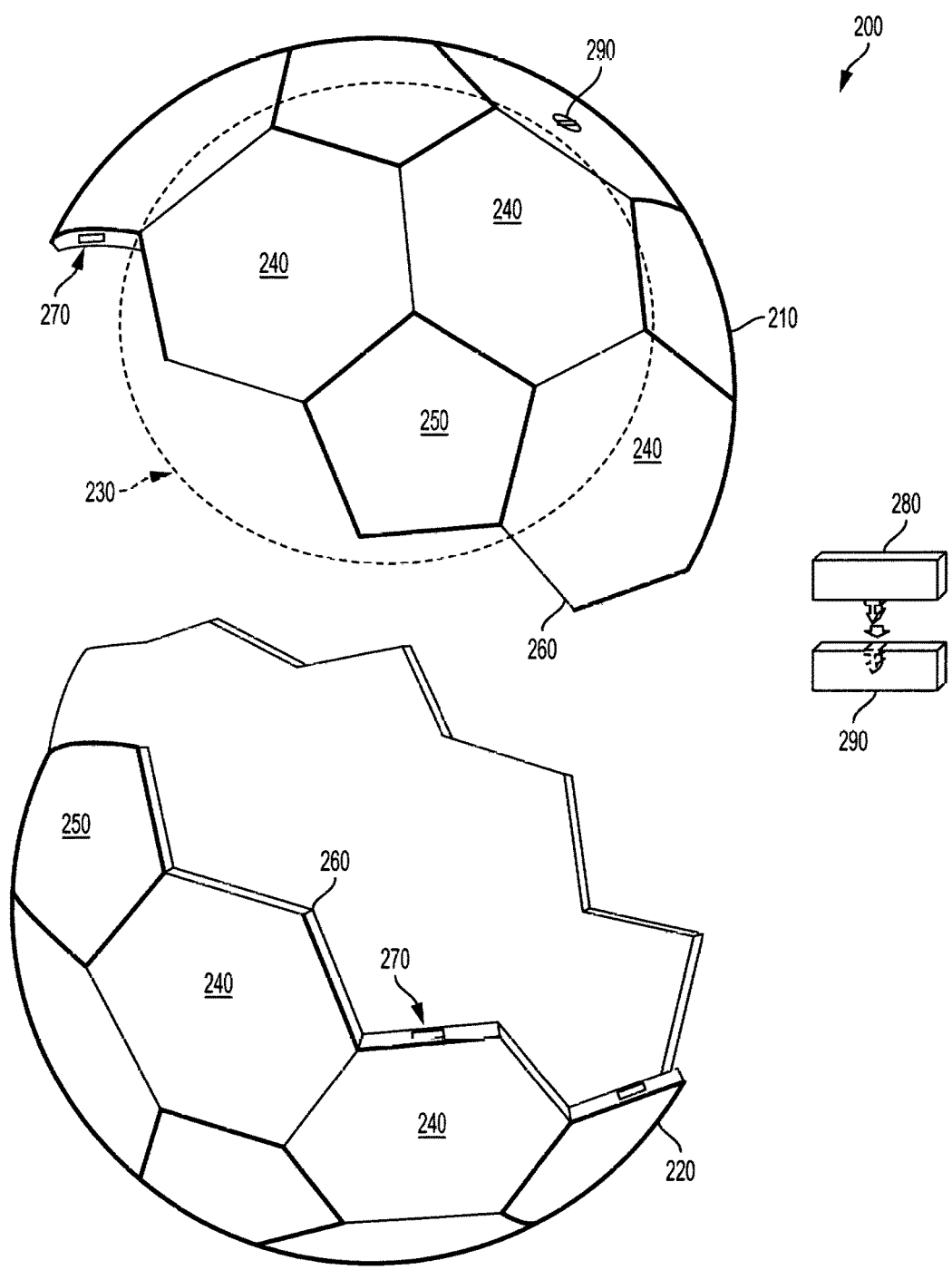
FIG. 2 is an isometric view of outer shell components.

FIG. 2 shows an exploded isometric view 200 of the outer shell 120 that can be divided into first and second domes 210 and 220. The outer shell 120 can exhibit an external geodesic pattern 230 (e.g., soccer ball) and separable along peripheries of the hexagons 240 and/or the pentagons 250, although this example is descriptive only and not limiting. Alternatively, the portions 210 and 220 can be symmetrical to facilitate manufacture. As assembled, the outer shell 120 can be composed of an appropriate material for travel along a floor or ground surface, such as a ceramic (e.g., alumina $Al_2O_3$—density 3.95 g/cm³, magnesium fluoride $MgF_2$—density 3.148 g/cm³), metal alloy (e.g., aluminum 6061—density 2.7 g/cm³) or thermoset plastic (e.g., polyethylene terephthalate $(C_{10}H_8O_4)_n$ also known as polyester—density 1.38 g/cm³), as well as possess a smooth interior surface to minimize friction with the inner ball 130.

Interface peripheries 260 of the portions 210 and 220 can include rectangular cavities 270 designed to receive complementary interlocking inserts 280 and 290 (shown enlarged adjacently) that can be sufficiently flexible to enable a tang of the male insert 280 to be received by a clevis of the female insert 285 to connect the halves 210 and 220 together. The inserts 280 and 290 can be secured within their respective cavities 270 by adhesive bonding. At least one of the portions 210 and 220 includes an intake port shown as a short countersunk screw 290 for inserting lubrication fluid, such as oil into the spherical gap that forms the lubrication layer 140. Alternatively, the intake port can incorporate a self-sealing check-valve.

Figure 3:
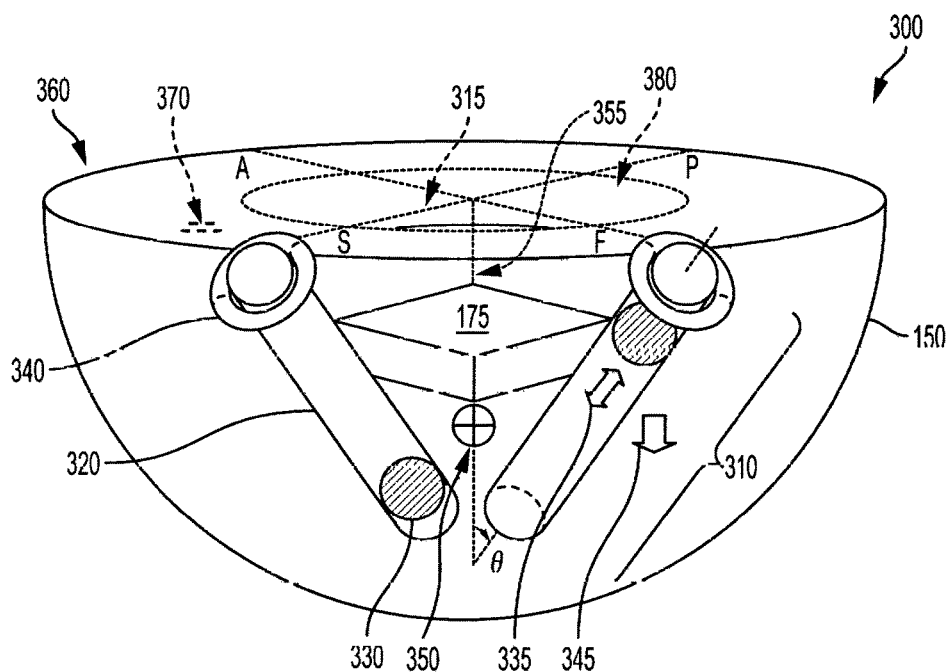
FIG. 3 is an isometric view of a lower module with cruciform weight-shifters.

FIG. 3 shows an isometric view 300 of the lower module 150. The plurality 170 of weight-shifters 310 can be disposed within the lower module 150 pointing upward and radially outward. In the configuration shown, a quartet of the weight-shifters 310 is arranged in a cruciform pattern 315 (as would be observable from above) labeled fore, aft, port and starboard (FAPS). Artisans of ordinary skill will recognize that four symmetrically arranged weight-shifters 310 represent merely a convenient description, whereas the plurality 170 can be configured to more or fewer such devices without departing from the scope of the invention.

Each weight-shifter 310 comprises a channel 320 along which an armature 330 (for example, a dense ball bearing) can travel along the direction arrow 335, and an electromagnet 340 to pull the armature 330 towards itself. The electromagnet 340 can constitute fine copper wire that wraps around an iron ring core. Alternatively, the weight-shifter 310 can employ a pulley attached to the armature 330 and pulled upward and radially outward by a stepper motor rather than the electromagnet 340.

As the armature 330 travels along arrow 335, its weight induces a downward force 345. The n-SEMITE 110 has a center-of-mass 350, which for a balanced inactive assembly lies along the vertical centerline 355. The force 345 displaced relative to the center-of-mass 350 produces a torque that causes the outer shell 120 to roll forward along the arrow 115, corresponding to the activated weight-shifter 310. Each channel 320 orients to diagonally rise from the bottom periphery near the centerline 355 to the lateral radial interface periphery 360 of the lower module 150 at a tilt angle θ from vertical of approximately ¼π rad or 45°, with the exemplary geometry being 42° in view 100.

The lower module 150 can be closed-cell polystyrene (e.g., Styrofoam™) or an aerogel for containing the weight-shifters 310 and the control assembly 175. Upon assemblage, the lower module 150 can be inserted into the lower dome 155, which would enable smooth interface with the interior of the outer shell 120. Alternatively, the lower module 150 and the lower dome 155 can substantially form an integrated unit by three-dimensional printing techniques to produce an encased honeycomb structure from thermoplastic filament for the cushioning interior to minimize weight while providing structural support of the weight-shifters 310 and other components. The volume of the lower module 150 is further defined by its upper surface 370 and a center cavity 380 in which the payload 180 can be inserted upon assemblage of the SEMITE 110.

Figure 4:
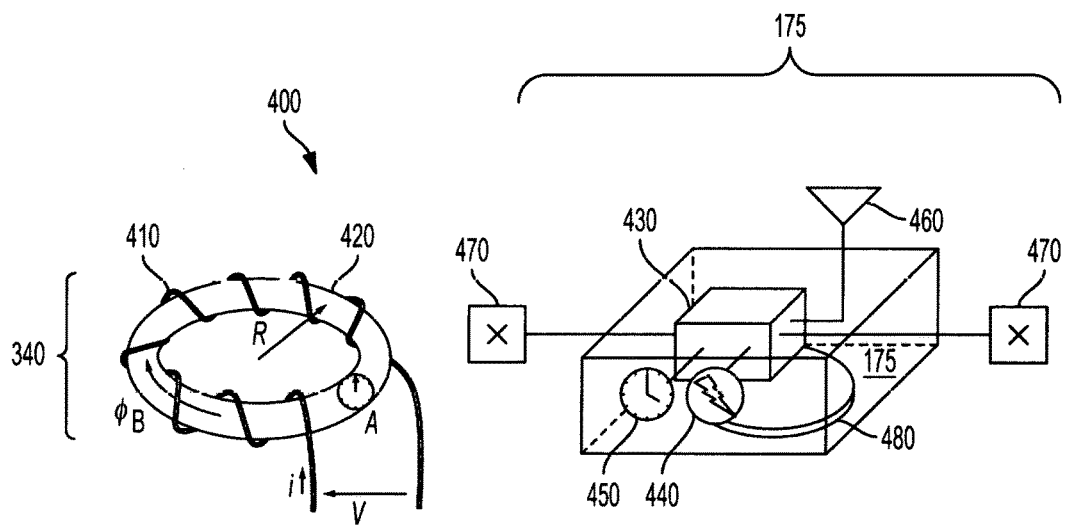
FIG. 4 is an isometric view of an assembly for electromagnet actuation and associated control.

FIG. 4 shows isometric views 400 of the electromagnet 340 and the control assembly 175. The electromagnet 340 in the weight-shifter 310 includes a wire coil 410 that wraps around a ferromagnetic core 420 having radius R and cross-section area A. Upon application of current i applied at voltage V, the electromagnet 340 produces a magnetic flux $\phi_B$. The electromagnet 340 can be activated by the control assembly 175 to controllably attract the actuator 330 and thereby shift the SMART's center of mass 350, thereby enabling movement in the direction of the center's shift.

The control assembly 175 includes a processor 430 that connects to a power supply 440, and input triggers, such as a timer 450, a signal receiver 460 (e.g., antenna) and a sensor 470 (e.g., accelerometers). The DE-ACCM3D (1.3 g) from Dimension Engineering in Akron, Ohio represents an example three-axis accelerometer board for such sensor purposes. An assembly for gyroscopic stabilization can also be included to counteract the tilting of the inner ball 130 that results from weight shifting of the armature 330. The counter-rotating coaxial flywheel system called gyroscopic homing stabilizer (GHoSt) 480 is shown associated control assembly 175, but can optionally be incorporated separately in the lower module 150.

The power supply 440 provides electrical current for the processor 430 and the electromagnets 340. Preferably, the sensors 470 constitute accelerometers to detect travel interruption in the direction of the activated weight-shifter 310. Such a condition indicates presence of an obstacle, hence to avoid the impediment to travel, the processor 430 can shift activation to an alternate electromagnet 340 within the cruciform pattern 315. The order of shifts can be based on a pre-selection sequence (e.g., FAPS), energizing durations, random pattern, or other criteria.

The channels 320 can have tubular cross-sections with corresponding spherical ball bearings as the armatures 330. Alternatively, the armatures 330 could be cylindrical roller bearings for sliding rather than rolling. At rest, the armatures 330 reside at the bottom of their respective channels 320 adjacent the center-of-mass 350 of the lower module 150. Upon activation, the electromagnet 340 pulls the corresponding armature 330 radially outward (and vertically upward) towards the radial periphery 360, thereby shifting the center-of-mass 350 in the direction of the weight-shifter 310 that corresponds to the active electromagnet 340. Upon deactivation, the armature 330 falls through its channel 320 returning to rest near the center-of-mass 350.

The armatures 330 can preferably be composed of a dense material, such as tungsten carbide (WC—density 15.63 g/cm³) or alternatively depleted uranium metal (U—density 19.12 g/cm³), with the armature 330 plated with a ferromagnetic material such as cobalt or iron by which to engage the electromagnet 340 when activated. For the exemplary sphere sizes considered, the armature 330 constitutes a WC ball bearing having a diameter of 0.7924 cm (0.312 inch), thus having a volume of 0.26059 cm³ and corresponding mass of 4.073 g. The channel 320 of each weight-shifter 310 would have a circular cross-section of 0.8 cm diameter through which the armature 330 could roll within from the base of the channel 320 adjacent the center-of-mass 350 to the electromagnet 340 near the interface periphery 360 when activated. Raising the WC ball (against gravitation to its mass accelerated to 9.8 m/s) would require a force of F=mg of 0.040 N.

Upon deployment, the SEMITE 110 can initiate rolling motion in response to a command signal to the receiver 460 and/or to a pre-established clock event from the timer 450. Although initial and terminal commands can optionally be imposed on the SEMITE 110, the processor 430 enables autonomous locomotion via shifts in center-of-mass 350 independently of external instructions. Guidance can be provided by internal travel vector calculations (i.e., inertial guidance) and/or by signals to the receiver 460 from the Global Positioning System (GPS) satellite network as to location relative to an intended target. Alternatively, the receiver 460 can receive input signals from a remote control input device.

The processor 430 can activate the electromagnet 340 of a pre-selected or randomly assigned weight-shifter 310, such as among the FAPS in the cruciform pattern 315. The processor 430 can be configured to preclude concurrent activation of multiple weight-shifters 310. Alternatively, the processor 430 can be configured to enable near-simultaneous activation and release of all of the weight-shifters 310, causing the SEMITE 110 to "jump" upward slightly and thereby indicate kinematic arrival at its intended destination based on inertial navigation and/or GPS identified location. This accelerometer signal could be augmented by supplemental location information or timing delays or multiple jumps within a stipulated interval to override false activation indicators such as descent along stair steps.

By attracting the armature 330 to roll within the channel 320 towards the electromagnet 340, the center-of-mass 350 of the inner ball 120, and thus the SEMITE 110 shifts away from the neutral mass center and in the direction of the activated weight-shifter 310. Thereafter, the processor 430 can avoid obstacles by maneuvering with alternating weight-shifters 310 based on signals from the accelerometers among the sensors 470 and terminate upon some established condition, such as from the receiver 460 and/or the timer 450 to cease locomotion. The receiver 460 can alternatively receive information from GPS to determine intended arrival, or be guided by remote control. Alternatively, the processor 430 can operate based on pre-programmed event scheduling based on the timer 450 and negotiate a route to its destination by inertial navigation.

Figure 5:
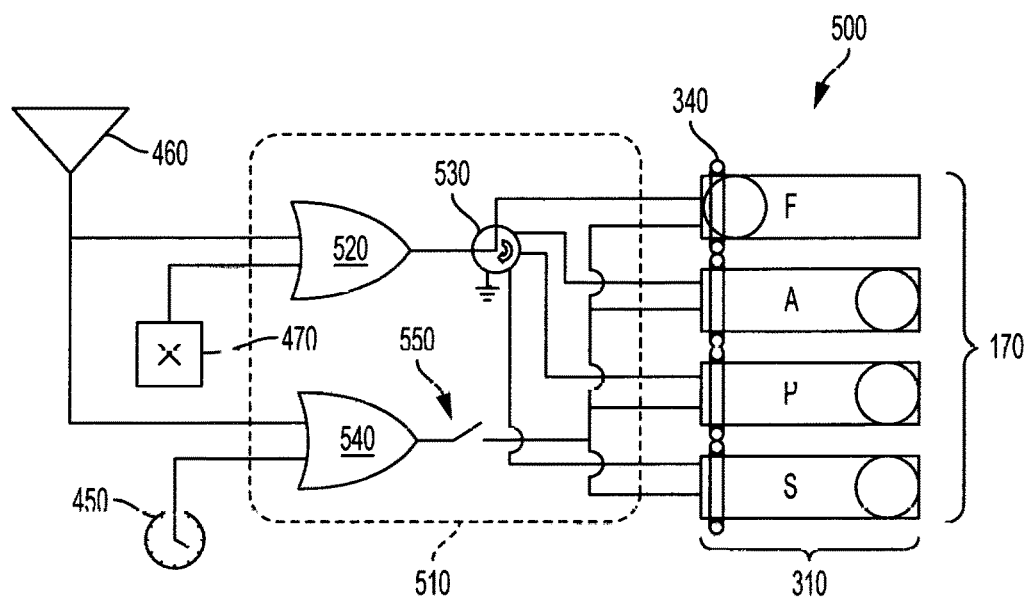
FIG. 5 is a logic diagram view of electromagnet activation switches.

FIG. 5 shows a schematic view 500 of a logic structure 510 for the processor 430 in the control assembly 175. The logic structure 510 includes a first .OR. gate 520 connected to a selection switch 530 shown in contact with the fore weight-shifter 310, with additional options by rotation including the other weight-shifters 310 and as well as a fixed potential known as ground. For example, the .OR. gate 520 responds to input signals from the receiver 460 and/or the sensor 470 to reset the selection switch 520 in response to an event or condition from these input components. The selection switch 530 can optionally select from among the plurality 170 of FAPS configured weight-shifters 310 as to which electromagnet 340 to energize by closing that selected circuit path.

Alternating among the weight-shifters 310 via the selection switch 520 enables the SEMITE 110 to maneuver by change in direction, inactivating the prior activated electromagnet 340 to a subsequent electromagnet 340. The logic processor 510 can also include a second .OR. gate 540 connected to a single pole switch 550, set to be open by default. The .OR. gate 540 receives input signals from the receiver 460 and/or the timer 450 in response to a condition, such as designated arrival at the intended target, and thereby closes the switch 550 to activate all the electromagnets 340 to initiate the jump.

Figure 6:
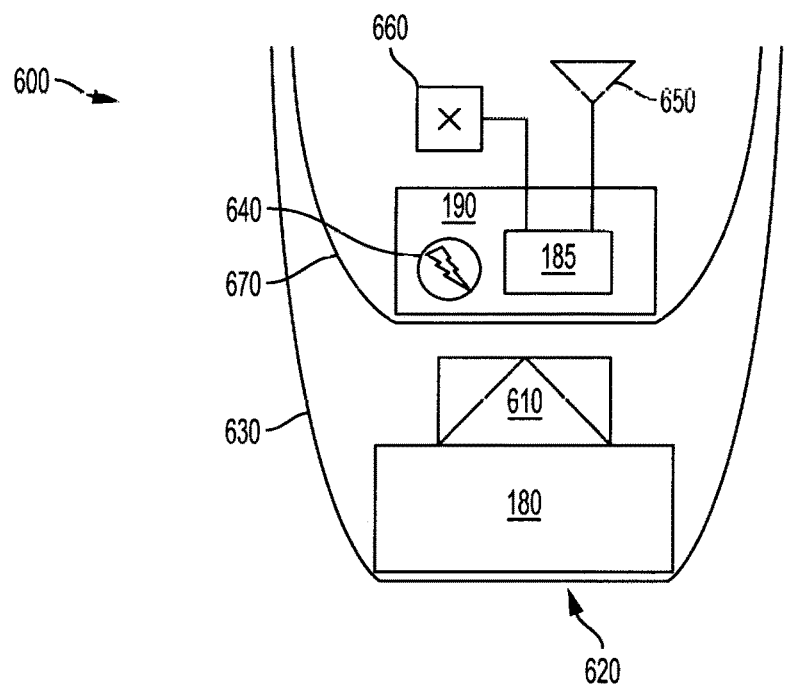
FIG. 6 is an elevation view of upper module components.

FIG. 6 shows an elevation view 600 of components for the upper module 150. The payload 180 can include a charge for detonation and/or distraction and be initiated by the trigger 185. For detonation, the payload 180 can constitute either high explosive for wide dispersal or else include a shaped charge 610 (e.g., inverted cone) for armor penetration from underneath. The upper module 160 can constitute a lightweight cradle 620 to contain the payload 180 disposed by suspension components 630 such as straps. The payload 180 thus can be secured above the lower module 150 upon integrated assembly. As an alternative to suspension components 630, the upper module 160 and its associated upper shell 165 can be formed as a unitary component as an encased honeycomb matrix produced by three-dimensional printing techniques.

The trigger 185 can be activated by a power supply 640 via signals from a receiver 650 or a sensor 660. In particular, the receiver 640 can include a GPS location indicator or an activation command; and the sensor 650 can constitute an accelerometer oriented for vertical motion to detect the jump by the lower module 150. The housing 190 can be supported by auxiliary suspension straps 670. The suspension components 630 can be ribbons that extend through the cradle 620 and secured in tension about the payload 180 within the cavity 380 upon assembly. The upper dome 165 preferably enables a smooth interface with the interior of the outer shell 120 to minimize friction between rolling and static components. Optionally, the payload 180 can be enveloped by polystyrene to restrict lateral movement within the upper module 160.

Figure 7:
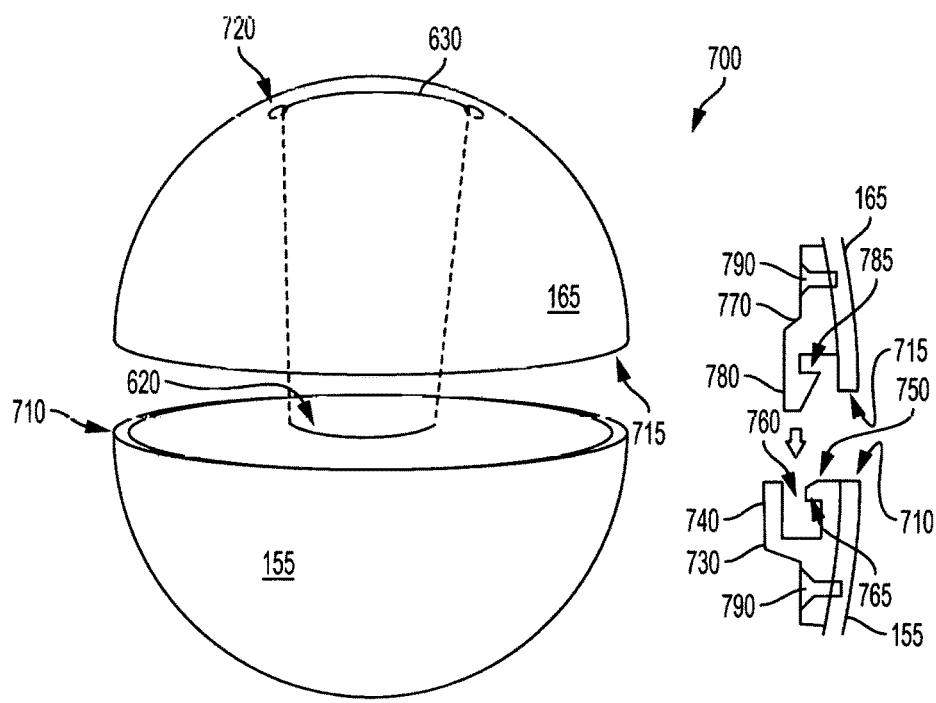
FIG. 7 is an isometric view of dome components, and an elevation cross-section view of dome fasteners.

FIG. 7 shows an exploded isometric view 700 of the domes 155 and 165 for the respective lower and upper modules 150 and 160, as well as an adjacent elevation cross-section view of fasteners for these domes. Mechanical connection of the domes 155 and 165 together can eschew electrical interferences because of the independence of the modules 150 and 160. The domes 155 and 165 preferably constitute symmetrical half-spheres.

The lower dome 155 presents an interface opening for receiving the lower module 150 defined by a lower rim 710. Similarly, the upper dome 165 presents an interface opening for receiving the upper module 160 defined by an upper rim 715. The upper dome 165 structurally maintains the payload 180 by fasteners, such as straps 620 that pass through holes 720 along the top of and into (depicted by dash lines) the upper dome 165. In an exemplary embodiment, the lower dome 155 includes slots or holes 730 to support the cradle 620.

As shown, the lower dome 155 includes a clevis fastener 730 including a cantilever flange 740 and a jaw 750 that define a recess 760. A ledge 765 provides an obstacle platform for the recess 760. The upper dome 165 includes a tang fastener 770 with a prong 780 that wedges axially into the recess 760. The prong 780 has a tip sufficiently flexible to pass between the flange 740 and the jaw 750 into the recess 760 along the arrow direction, and includes a terminal lip 785 that upon insertion into the recess 760 abuts the ledge 765 to inhibit removal. The clevis and tang fasteners 730 and 770 present complementary snap together counterparts with their respective recess 760 and prong 780 for securing the domes 155 and 165 to each other.

The domes 155 and 165 can be fabricated from an appropriate rigid material such as a ceramic (e.g., alumina $Al_2O_3$, magnesium fluoride $MgF_2$), metal alloy (e.g., aluminum 6061) or thermoset plastic (e.g., polyethylene terephthalate). For inner ball 130 components stamped from sheet metal (providing inclusion of transmission windows to permit radio signals to enter), the clevis and tang fasteners 730 and 770 can be secured to their respective domes 155 and 165 by attachment mechanisms, such as shallow countersunk screws 790. Alternatively, the fasteners 730 and 770 can be incorporated directly in fabrication, such as by injection molding. In other exemplary embodiments, the snap fasteners can be oriented angularly so that the prong 780 inserts into the recess 760 and rotated to lock the mechanism assembly.

Complementary fasteners 730 and 770 can be angularly distributed along the respective interior surface of the rims 710 and 715, while avoiding interference from their radially inward protrusion to the weight-shifters 310. The arrangement of the fasteners 730 and 770 can be uniformly designated for respective domes 155 and 165, or in alternation by complementary pairs along each rim for mutual alignment. Depending on whether the fasteners 730 and 770 have flanking walls on one or both sides of the recess 760, the domes 155 and 165 can be permitted to be rotated relative to each other to release them, or precluded from such an option.

For a croquet size device, the outer shell 120 has an outer radius of 4.6 cm. Assuming a thickness of 0.12 cm, the inner radius would be 4.48 cm for a total material volume of 31.1 cm$^3$. Composed of polyester, the outer shell 120 would have a mass of 42.9 g and a thin-sphere moment of inertia of I=⅔m·R$^2$, where m is mass and R is average radius to yield 5.90E-5 kg-m$^2$. An exemplary inner ball 130 could have respective outer and inner radii of 4.43 cm and 4.30 cm for a total material volume of 28.7 cm$^3$. Composed of polyester, the inner ball 130 would have a mass of 39.6 g and a moment of inertia of 5.03E-5 kg-m$^2$. Assuming a cylindrical explosive with a radius of 2.0 cm and height of 2.0 cm, the payload has a volume of 25.1 cm$^3$. Using HMX for an explosive with a density of 1.91 g/cm$^3$, the mass of the payload 180 can be estimated at 48.0 g.

Using the 4.073 g WC ball bearing as the armature 330 requires a lifting force of 0.040 N. Electromagnetic force can be quantified by the solenoid relation F=(N·i)$^2$μ$_0$·A/(2L$^2$), where N is number of wire turns around the core, i is the current, μ$_0$=4πE−7 N/A is permeability, A is cross-section area and L is length gap between the armature 330 and the electromagnet 340. For purposes of exemplary embodiments, current is taken as 3.6 A supplied by six 9-V batteries arranged in parallel for the power supply 440, and length gap is 5 cm (0.05 m). A typical 9-V battery has a mass of 45 g.

For 500 turns using 36-gauge wire (rated at 4 A) winding 78.7 turns-per-centimeter, the exemplary electromagnet 340 would have a core perimeter of 6.353 cm, which can be converted to a toroidal coil of 2.02 cm for inner diameter. The cross-section area can be estimated at 0.5 cm$^2$ (5E-5 m$^2$) based on a core diameter of 0.8 cm. (The inner core dimension together with the cross-section indicates the core radius of 1.42 cm for view 400.) This yields solenoid force of F=0.041 N adequate to elevate the armature 330. Alternatively, a cascade of electromagnets 340 could be disposed along the length of the channel 320 with successive electromagnets 340 raising the armature 330 sequentially. Such design would entail additional control logic by the processor 430 to avoid excess drain on the power supply 440.

The exemplary electromagnets 340 would have an approximate mass of 25 g each and provide a moment of inertia estimated at 6.0E-5 kg-m$^2$. At rest, the armatures 330 would have a negligible moment, being disposed near the center-of-mass 350. The payload 180 (48 g) and batteries for power supply 440 (270 g) plus other components can be estimated as having a mass of 500 g distributed about 2 cm in radius and along a height of about 3 cm, with a corresponding cylindrical moment of 8.7E-5 kg-m. Total moment of the SEMITE 110 can thus be estimated based on the outer shell, the inner ball and internal components as about 2.6E-4 kg-m$^2$. A single activated armature 330 would induce a moment of about 70 g-cm$^2$ (7.0E-6 kg-m$^2$). The torque produced by the internal mass shift within the lower module 150 can be expressed as T=L·F·sin(θ)=I·α, where L is travel length along the channel 320, F is the force applied by the armature 330 upon activation of the electromagnet 340, θ is the tilt angle, I is total moment of inertia and α is angular acceleration.

For the exemplary n-SEMITE configuration, force constitutes armature mass of 0.004 kg multiplied by gravitational acceleration of 9.8 m/s$^2$ yielding 0.04 N (as described earlier for raising the armature), length is about 5 cm, and tilt angle θ is about 42°. This produces a torque of 1.3E-3 N-m. With total moment estimated to be 2.6E-4 kg-m$^2$, this yields an angular acceleration of about 5 rad/s$^2$. Continuous acceleration for 2.0 s yields an instantaneous radial speed of 10 rad/s or 1.59 revolutions-per-second. With a diameter of 9.2 cm, the outer shell 120 has a circumference of 28.9 cm and thus within two seconds could travel 0.23 m at a speed of 0.46 m/s. Assuming continuous acceleration were achievable with an available power supply 440, the SEMITE 110 could reach highway travel speed of 100 km/hr (27.7 m/s) within 35 s on a smooth surface.

Figure 8:
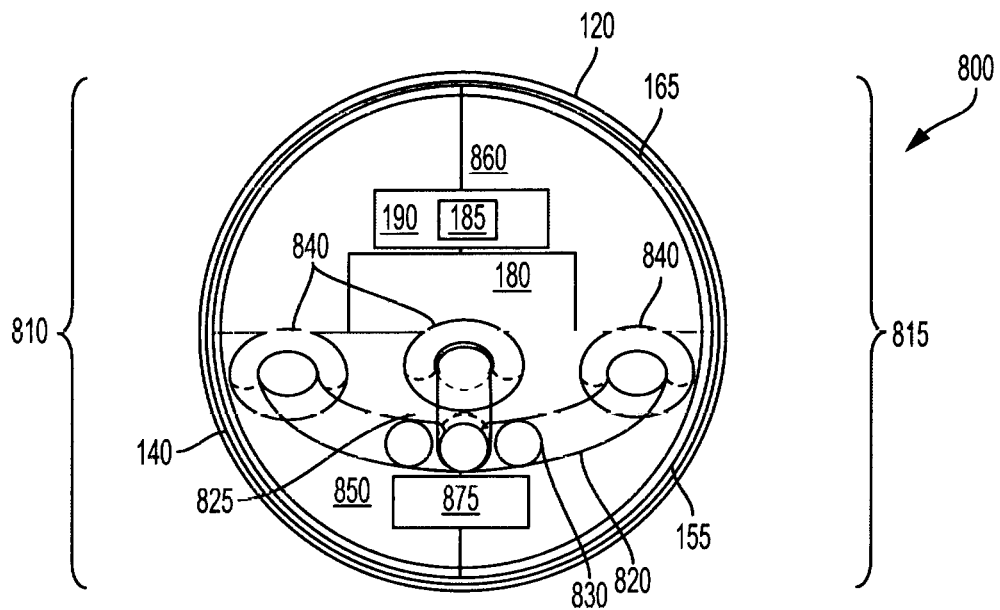
FIG. 8 is an elevation view of a biased electromagnetic spherical traveler assembly.

FIG. 8 shows an elevation cross-section view 800 of an exemplary bias SEMITE 810 for travel forward relative to the view 800, as an alternative to the cruciform weight-shifter configuration for the n-SEMITE 110. The b-SEMITE 810 includes the same outer shell 120, lubrication layer 140, domes 155 and 165, payload 180, trigger 185, and housing 190 as the n-SEMITE 110. The domes 155 and 165 contain an inner ball 815 that includes weight-shifter assemblies. These include flanking lateral channels 820 and a radial channel 825 in which armatures 830 roll, and electromagnets 840 at the distal ends of the channels 820 and 825. The armatures 830 can constitute WC ball bearings, and the electromagnets 840 can be substantially similar to their n-SEMITE counterparts 340, albeit with potentially distinctive physical characteristics and performance.

The channels 820 and 825 have substantially circular cross-sections as their n-SEMITE counterpart 320. The weight-shifting assemblies are contained within a lower module 850, and the payload 180, trigger 185 and housing 190 are contained in an upper module 860. A control assembly 875 can be contained within the lower module 850. The modules 850 and 860 can be combined with their respective cases 155 and 165 composed of thermoplastic with honeycomb interior by three-dimensional printing techniques.

Figure 9:
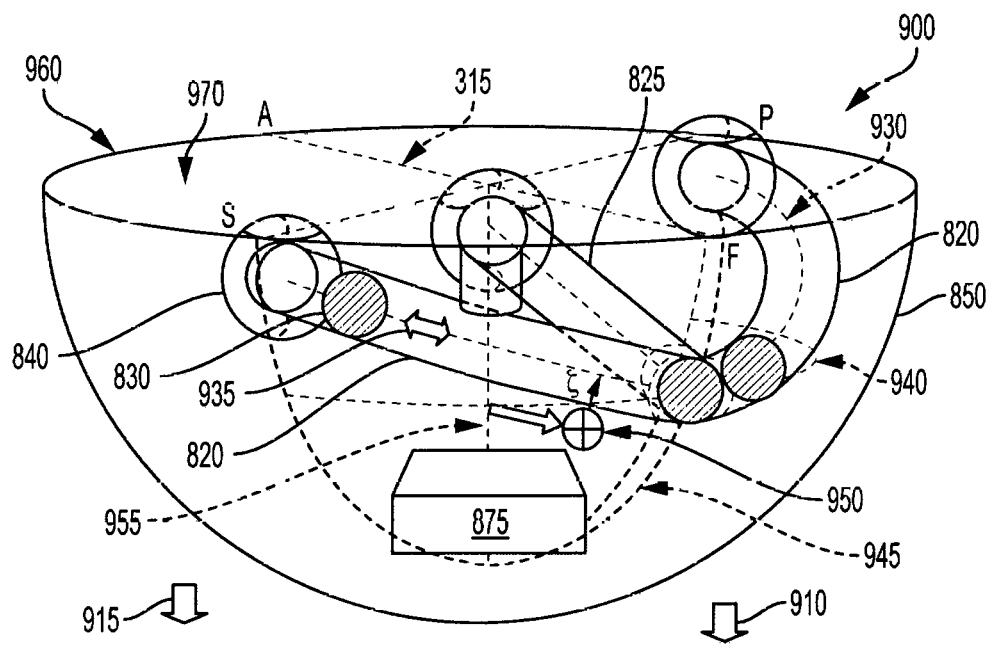
FIG. 9 is an isometric view of a lower module with lateral weight-shifters

FIG. 9 shows an isometric view 900 of the lower module 850. Orientation of the lower module 850 can be described by the pattern 315. Unlike the n-SEMITE lower module 150 with the armatures 330 at rest adjacent to the center-of-mass 350, the b-SEMITE lower module 850 positions three armatures 830 adjacent the lower case 155, thereby imposing a weighting force downward by arrow 910, thereby inducing forward motion of the b-SEMITE 810 while at rest, i.e., with no electromagnets 840 turned on. Upon activation of the starboard electromagnet 840, the closest armature 830 rolls within peripheral channel 820 curving toward starboard, thereby imposing a weighting force downward 915. The radial channel 825 terminates at the cruciform center with a vertical shaft cavity 920 to receive armatures 830.

The lateral channels 820 extend from their bases to the starboard and port sides along travel lines 930, with the armatures 830 moving along direction arrow 935 oriented upward from a mid-latitude arc 940 by a slope angle $\zeta$ of about 10°. The bases of the channels 820 and 825 join at an intersection along the mid-latitude arc 940 and a forward longitude 945, adjacent the periphery of the lower case 155 (upon assembly).

The armatures 830 at the base of the channels 820 bias the assembly's center-of-mass 950 forward from the vertical centerline 955. The starboard and port channels 820 terminate adjacent a radial periphery 960 of the lower module 850. The electromagnets 840 are disposed proximate to an interface surface 970 of the lower module 850. Activation of either the starboard or port electromagnet 840 causes the most proximate armature 830 towards its corresponding side to respectively initiate a right or left turn. The control assembly 875 for the b-SEMITE 810 provides similar actuation initiation for the electromagnets 840, as well as navigation commands, as described for the control assembly 175 for the n-SEMITE 110.

By contrast, activation of the center electromagnet 840 reduces distance between the center-of-mass 950 from the centerline 955 via individually rolling the armatures 830 through the radial channel 825 and into the cavity 920 for repository. Whereas the n-SEMITE 110 employs weight-shifters 310 in cruciform configuration, the peripherally extending channels 820 define operation of the b-SEMITE 810. For the alternate b-SEMITE configuration, the three armatures 830 produce a moment of about 200 g-cm$^2$ (2.0E-6 kg/m$^2$) while the electromagnets 840 remain inert. For triple armature mass of 0.012 kg yields a force of 0.12 N over a radial length of about 3.5 cm from the centerline 955 yielding a torque of about 4.2E-3 N-m. The same assembly moment of about 2.6E-4 kg-m$^2$ results in an angular acceleration of about 16 rad/s$^2$, thereby enabling higher acceleration, albeit with reduced ability to remain stationary.

Figure 10A:
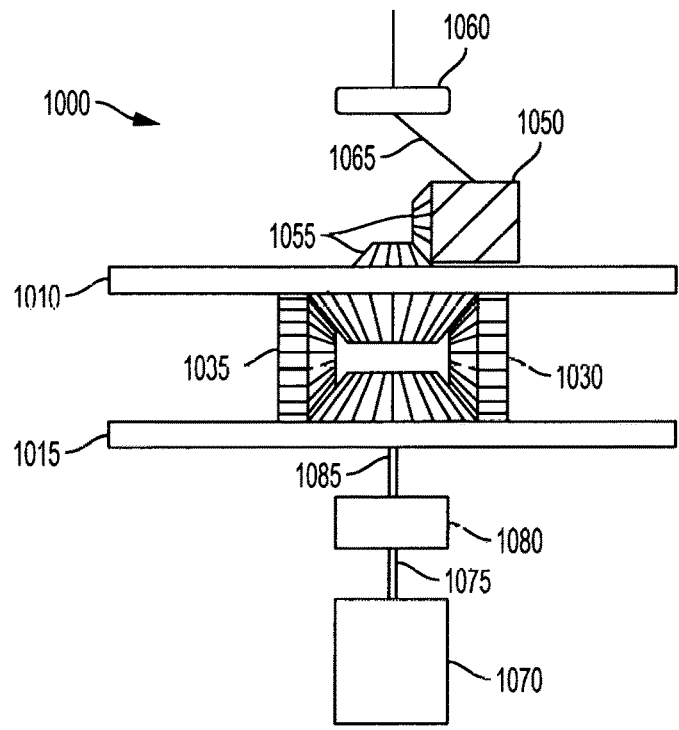
FIGS. 10A and 10B are elevation and isometric views of gyro balancing assembly.
Figure 10B:
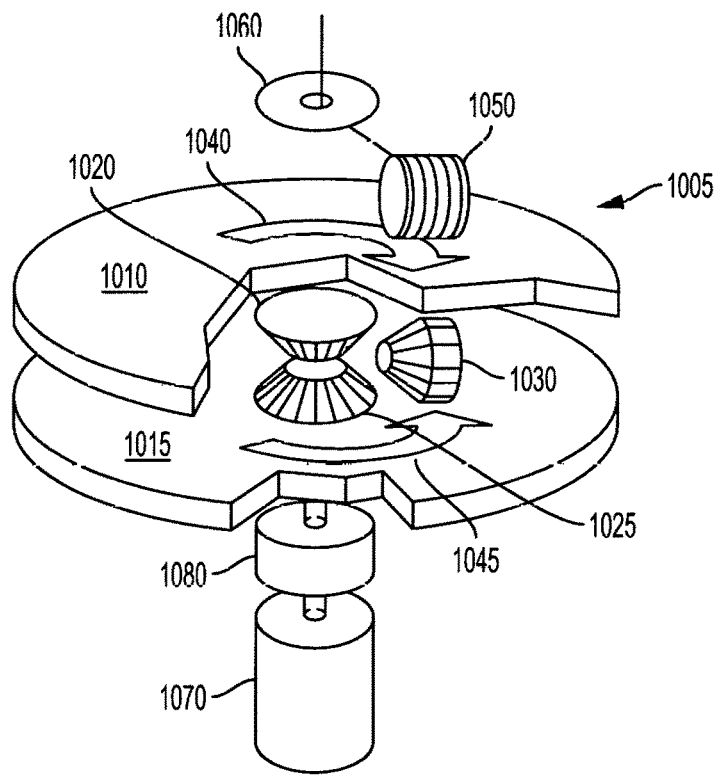

FIG. 10A shows an elevation view 1000 of the GHoSt 480 mounted to the lower module 150. FIG. 10B shows an isometric view 1005 of the GHoSt 480, which includes first and second flywheels 1010 and 1015 (shown in cut-away in view 1005) that rotate parallel to each other about an axis aligned with the centerline 355 of the lower module 150. The first flywheel 1010 attaches to a first axial bevel gear 1020. The second flywheel 1015 attaches to a second axial bevel gear 1025.

To fit within the middle portion of the lower module 150, the flywheels 1010 and 1015 could be about 3 cm in diameter and about 0.3 cm in thickness. Such flywheels composed substantially of lead (Pb—density 11.34 g/cm$^3$) would each have a volume of 2.1 cm$^3$ and a mass of about 24 g. The flywheels 1010 and 1015 are shown as flat disks. Artisans of ordinary skill will recognize that alternative axisymmetric configurations can be envisioned without departing from the claim scope. In particular, the flywheels 1010 and 1015 can both have geometries with greater thickness at the peripheral rim than closer to the shaft 1085 to increase moment of inertia.

A transfer bevel gear 1030 connects the flywheels 1010 and 1015 together so that they can rotate in opposite directions. An auxiliary bevel gear 1035 can also connect the flywheels 1010 and 1015 for additional force balancing. Regarding counter-rotation, for the first flywheel 1010 to rotate clockwise 1040 about the centerline 355, the second flywheel 1015 rotates counter-clockwise 1045 accordingly. By rotating at high speed about the centerline 355, either flywheel 1010 or 1015 provides stabilization by conservation of angular momentum to maintain the lower module 150 in an upright orientation. U.S. Pat. No. 3,767,139 to Fischell describes an example of this effect. The opposite rotation of the flywheels 1010 and 1015 counteracts tilting of the module 150 from precession that can result from secondary imbalances in the GHoSt 480. The angular velocity of the flywheels 1010 and 1015 is estimated at 25 radians-per-second, equivalent to four revolutions-per-second, equivalent to ~240 rpm.

The flywheels 1010 and 1015 can be initiated for rotation by a spool 1050 connected to an upper initiating bevel gear assembly 1055 that transfers rotary motion from the spool 1050 to the first flywheel 1010. A grommet 1060 guides a cord 1065 that spirals around the spool 1050 for extension along the centerline 355. The cord 1065 can be passed through an inner orifice in the upper dome 165 and then through an outer fill orifice that receives the screw 290. Prior filling the lubrication layer 140, the cord 1065 can be pulled out, spinning the spool 1060 and thereby turning the transfer bevel gear 1030 that rotates the flywheels 1010 and 1015 in opposite directions. For a cord 1065 of size 15 at 0.0101 cm in thickness wraps around a spool 1050 of 1.0 cm in length for about ninety-five turns. For a diameter of the spool 1050 at 0.5 cm, the cord 1065 has a minimum length of ~150 cm. Pulling the cord 1065 out in about two seconds accelerates the spool 1050 to ~50 cycles-per-second, necessitating a 5:1 speed ratio between gears 1055, assuming minimal losses to friction.

Alternatively, the flywheels 1010 and 1015 can be initiated by a direct current motor 1070 energized by the power supply 440 and connected by a motor shaft 1075 aligned to the centerline 355. To provide high-torque at low angular speed to initiate such spin, the motor's low-torque high-speed rotation (often several thousand rpm) can be directed through a transmission gearbox 1080 connected to a transmission shaft 1085 to one of the flywheels (shown as the second flywheel 1015) or else one of the bevel gears 1030 and 1035.

Figure 11:
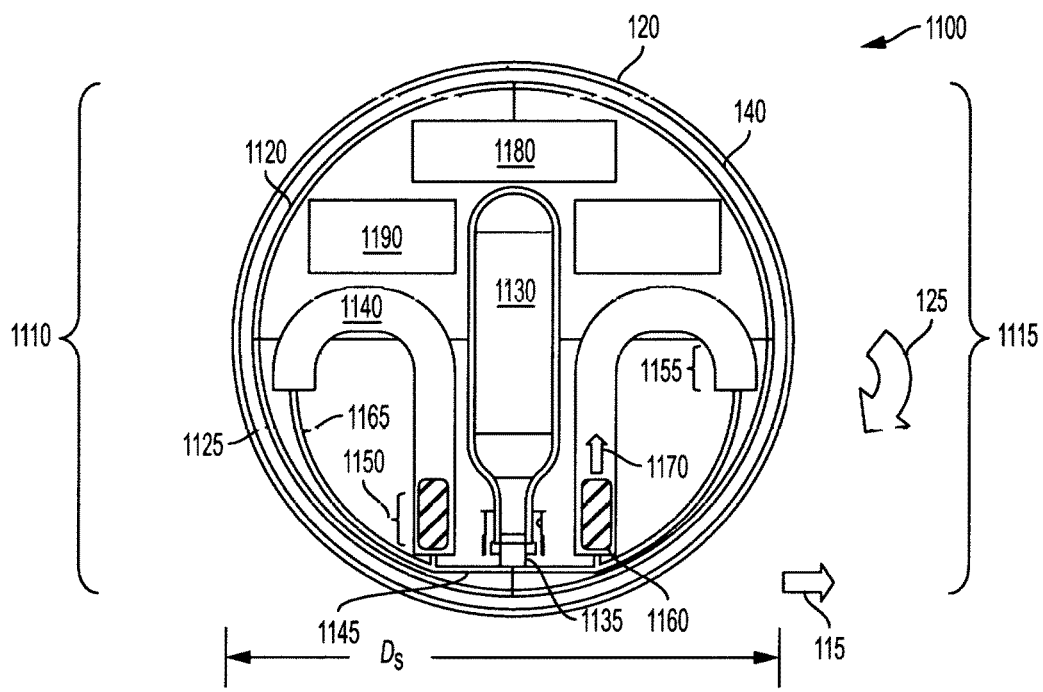
FIG. 11 is an elevation view of a pneumatic spherical traveler assembly.

Another alternate version of the SMART can operate by pneumatic actuation, as described for a SPARC. FIG. 11 shows an elevation cross-section view 1100 of an exemplary SPARC 1110 for travel forward in direction 115, as an alternative to electromagnetic actuation for the SEMITE. The SPARC 1110 includes the same or analogous outer shell 120 and lubrication layer 140 as the n-SEMITE 110, shown with similar dimensions. For travel along direction arrow 115, the outer shell 120 rolls clockwise by the arrow 125 along a smooth frictional surface substantially perpendicular to the local gravitational field.

An inner sphere 1115 houses the pneumatic actuation components within upper and lower domes 1120 and 1125 (analogous to the SEMITE domes 155 and 165). Pneumatic pressurization can be provided using pressurized carbon dioxide ($CO_2$), as supplied by an eight-gram (8 g) cartridge 1130 shown mounted neck down coaxial with the centerline 355. Such cartridges contain about eight grams of $CO_2$ at 860 psi (5.9 MPa) pressure at 72° F. (22° C.), and have a length of 2.5 inches (6.35 cm) and an outer diameter of 0.75 inch (1.9 cm). As such, for a SPARC 1110 conforming to the size of a croquet ball (diameter 9.2 cm), the cartridge 1130 extends more than half of the internal diameter, and thus oriented vertically straddles within both lower and upper domes 1120 and 1125.

A pressure-regulator valve 1135 releases the $CO_2$ gas from the cartridge 1130 at reduced pressure to fill one of several pneumatic chambers 1140 disposed neighboring the cartridge 1130 and extending radially outward within the inner sphere 1115. The chambers 1140 can be angularly distributed in a cruciform, such as described for FAPS, although in the elevation view 1100, only the forward and aft units are shown. The chambers 1140 connect to the valve 1135 by activation gas feed lines 1145 that enter into a base section 1150 of each chamber 1140. The base section 1150 constitutes an inertial resting position adjacent the cartridge 1130 and at the bottom periphery of the inner sphere 1115. An upper section 1155 represents the opposite terminus of the chamber 1140, disposed near the outer periphery within the inner sphere 1115.

A liquid metal actuator 1160 is stored within the chamber 1140 for traveling between the base and upper sections 1150 and 1155. The valve 1130 also connects to the upper section 1155 via return feed lines 1165. Upon release of pressure by the valve 1130 through the appropriate forward feed line 1145, the actuator 1160 moves from the base section 1150 upward and radially outward along direction 1170 towards the upper section 1155 so as to shift the mass of the SPARC 1110 in the forward direction 115. Pressurizing the return feed line 1165 enables the actuator 1160 to transfer from the upper section 1155 back to the base section 1150.

The liquid metal actuator 1160 can be composed of mercury (Hg) having a density of 13.6 g/cm³ and melting point of −39° C., or alternatively (for reduced toxicity) of galinstan, an alloy of eutectic gallium-indium-tin (68 wt % Ga, 22 wt % In, 10 wt % Sn), having a density of 6.4 g/cm³ and melting point of −19° C. A mercury actuator 1160 with a mass of 15 g encompasses a volume of 1.1 mL. Similarly, a galinstan actuator 1160 of the same mass has a volume of 2.3 mL. For a diameter in the chamber 1140 of 0.80 cm, these would entail respective actuator lengths of 2.2 cm and 4.7 cm. Alternatively, an alternative high density liquid or gel could be contemplated without departing from the claim scope.

A control assembly 1180 above the canister 1130 provides commands to control individual secondary valves for the chambers 1140. A payload module 1190 can be housed in an annular structure around the canister 1130 and vertically disposed between the chambers 1140 and the control assembly 1180. The payload 1190 can include telemetry and/or self-destructive components, depending on the mission. The control assembly 1180 can include processor, signal receiver and spin stabilizing components, as described for the control assembly 175 for the SEMITE 110.

Figure 12:
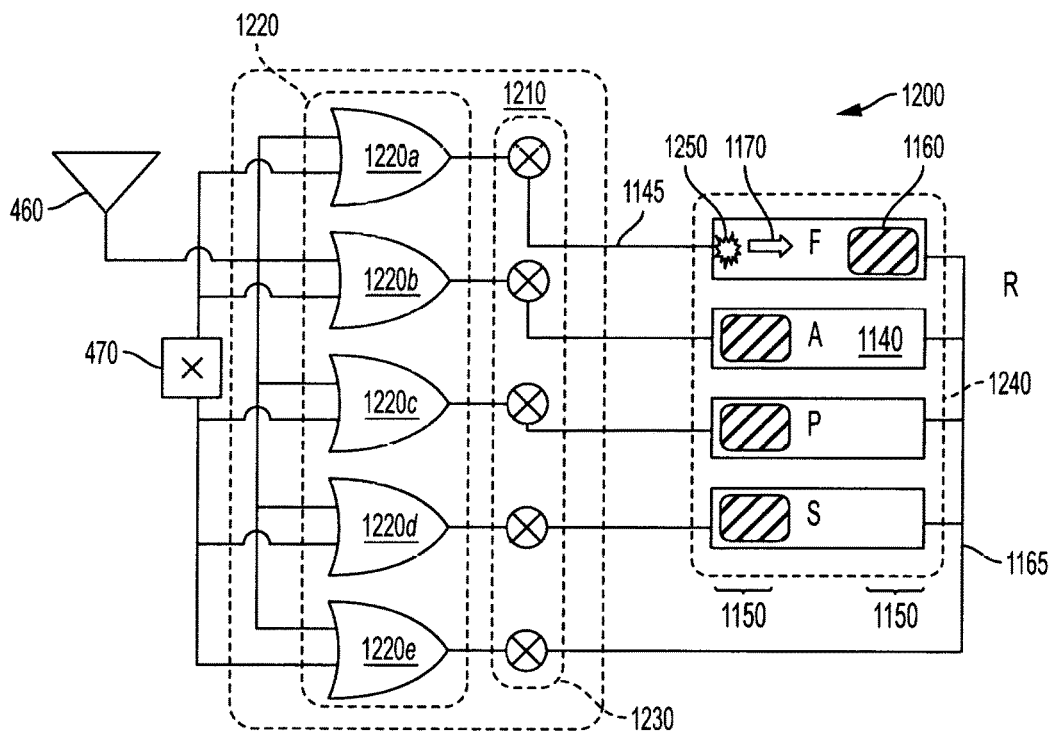
FIG. 12 is a schematic view of an assembly for pneumatic actuation and associated control.

FIG. 12 shows a schematic view 1200 of a logic structure 1210 for processor 430 in the control assembly 1180. The logic structure 1210 includes a series of .OR. gates 1220 (1220a forward, 1220b aft, 1220c port, 1220d starboard, 1220e return) connected to corresponding feed valves 1230 (each constituting a separate gate-valve pair) that supply their separate activation feed lines 1145 for the first four pairs and the return feed lines 1165 for the fifth pair. The gates 1220 receive input signals from the receiver 460 and/or the associated sensor 470 (e.g., accelerometer) to activate the valves 1230.

A plurality 1240 of the channels 1140 include the FAPS series, although other configurations can be designed without departing from the scope of the contemplated embodiments. As shown, the forward chamber has received pressurized gas in the base section 1150 to push the liquid metal armature 1160 from the base section 1150 to the upper section 1155 so as to propel the SPARC 1110 in the forward direction 115. Pressurizing the upper sections 1155 by the return feed line 1165 causes the armature 1160 to be pushed radially inward in its chamber 1140 and gravitationally descend back to the base section 1150. In this manner the armatures 1160 can be controllably directed toward their corresponding upper sections 1155 to shift the moment of inertia of the SPARC 1110 and thereby induce rolling motion.

Figure 13:
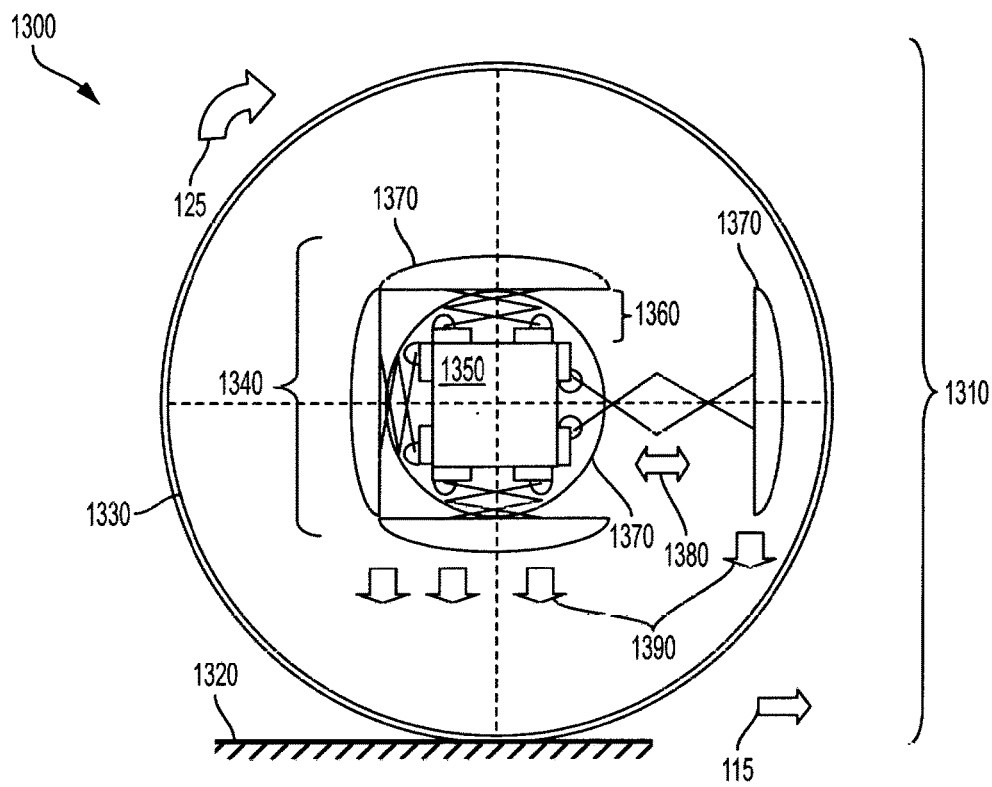
FIG. 13 is an elevation view of a spherical tumbler with a control cube and associated mechanically extendable weight-shifters.

FIG. 13 shows an elevation view 1300 of a spherical weight-shifting integral free-rolling tumbler (SWIFT) 1310 for locomotion along a surface 1320 by rolling clockwise by arrow 125 along direction arrow 115. An outer spherical shell 1330 contains a propulsion assembly 1340 with an actuation box 1350 having a six-sided substantially cubic shape in the shell's geometric center. The shell 1330 can be assembled from complementary domes 210 and 220, and fabricated from an appropriate rigid material such as a ceramic (especially for resemblance to a lacquered billiard ball), metal alloy or thermoset plastic. A scissors lift 1360 associated with a weight 1370 corresponds to each side face of the box 1350. The lift 1360 includes a proximal end that connects to the box 1350, and a distal end that attaches to the weight 1370.

The box 1350 comprises orthogonally arranged face panels to provide a structure onto which the lifts 1360 can be movably attached. The box 1350 also contains a control system for synchronizing the lifts 1360, with a processor 430, electrical power supply 440, timer 450, receiver 460 and sensors 470. Because this exemplary configuration does not require an upright internal portion from which to alter moment of inertia (by translating weights within the interior), the SWIFT 1310 can be integral design, with separate modular components.

At rest (i.e., default inactive mode), the lift 1360 remains furled so that the weight 1370 remains near the box 1350. Upon command, the lift 1360 extends along direction arrow 1380 to push the weight 1370 towards the periphery of the shell 1330 in the extension position (active mode), and subsequently retracts along the arrow 1380 to return the weight 1370 to its rest position. The weights 1370 provide a downward force 1390 towards the surface 1320. Extension of one of the weights 1370 towards the shell's periphery along arrow 1380 produces a moment that shifts the SWIFT's center of mass along the direction 115 of travel.

Figure 14:
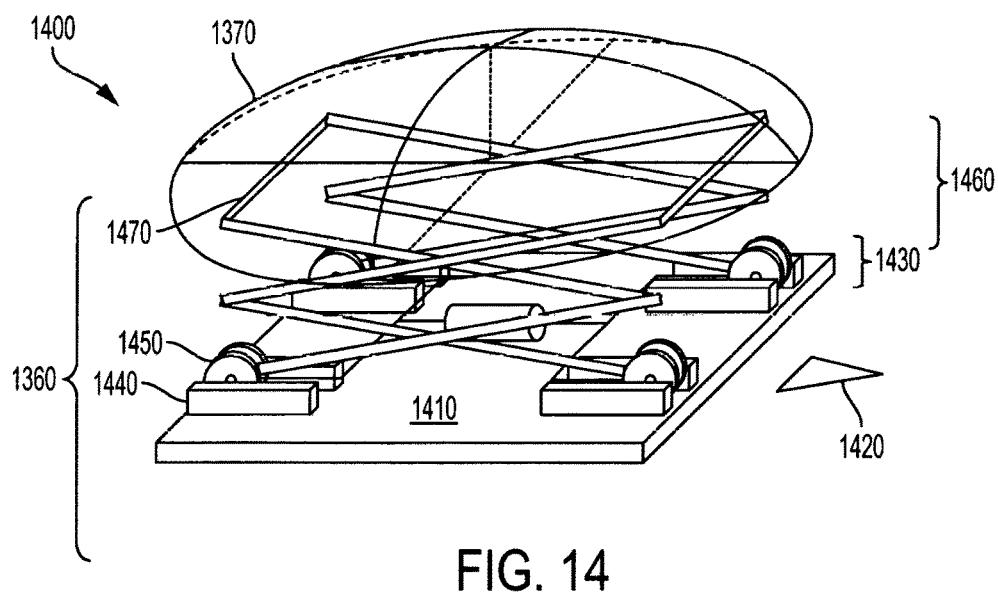
FIG. 14 is an isometric view of an actuator in an inert configuration.

FIG. 14 shows an isometric view 1400 of an actuator assembly in an inert retraction (i.e., rest) mode. A panel 1410 of the cubic box 1350 is shown with a compass arrow 1420 indicating "north" orientation for purposes of this description to identify corners clockwise distal right northwest (NW), proximal right northeast (NE), proximal left southeast (SE) and distal left southwest (SW). The panels 1410 can be composed of virtually any stiff and economical material, such as thermoset plastic (e.g., polyimide, polyester). A track-wheel assembly 1430 is disposed adjacent each corner and comprises a track race 1440 and a travel wheel 1450 that rolls or slides within the race 1440. In the rest mode, the wheels 1450 are disposed adjacent the north and south edges of the panel 1410 at the distal ends of their respective races 1440.

A proximal pair of scissors 1460 straddles between two assemblies 1430 adjacent the NE and SE corners. A distal pair of scissors 1460 straddles between two assemblies 1430 adjacent the NW and SW corners. Note that proximal and distal associations in this context are referenced in relation to view 1400. The two scissors pairs 1460 can be joined by spars 1470 to improve rigidity and to support the weight 1370 that is disposed thereon. For a SWIFT 1310 having a billiard ball diameter of 5.7 cm, each panel 1410 of the box 1350 could have dimensions of 0.9 cm on each edge for a total volume of 0.636 cm³ assuming thickness of 0.02 cm. Such a small volume might necessitate the use of button batteries for the power supply 440 and an ASIC for the processor 430. Additionally, the weights 1370 may be repositories of a payload 180 for delivery.

Figure 15:
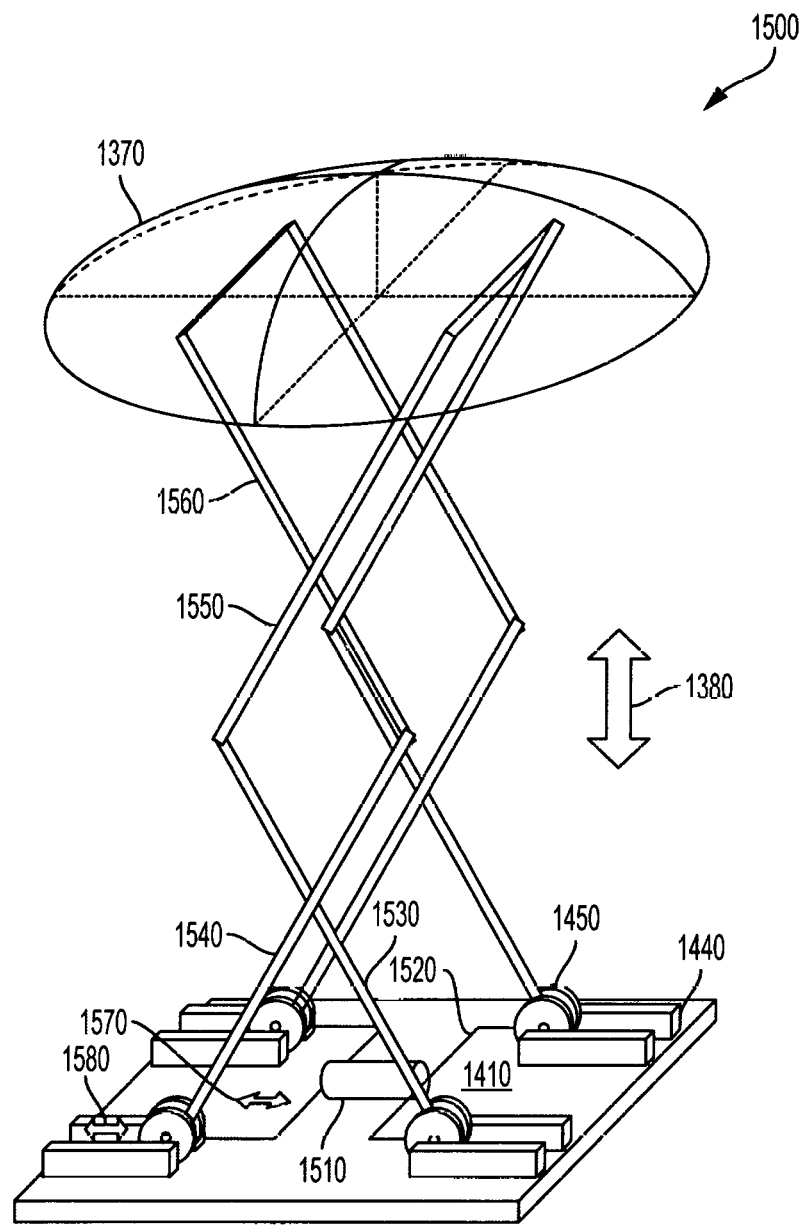
FIG. 15 is an isometric view of the actuator in an activation configuration.

FIG. 15 shows an isometric view 1500 of the actuator assembly in an extension mode. A linear piston-drive actuator 1510 retracts a yoke 1520 connected to the wheels 1450. Each scissors pair 1460 includes a proximal north edge member 1530 and a proximal south edge member 1540 connected by pin joint approximately midspan on both. Each member 1530 and 1540 connects by a pin joint to its associated wheel 1450. The proximal north edge member 1530 connects by pin joint to a distal south edge member 1550. The proximal south edge member 1540 connects by pin joint to a distal north edge member 1560. The distal south and north edge members 1550 and 1560 connect midspan by pin joints and separately connect to the spars 1470 that attach to the weight 1370. Note that proximal and distal associations in this context are referenced in relation to the panel 1410. The actuator 1510 can be replaced by synchronized linear push-pull devices for the wheels 1450 adjacent the western and eastern edges.

In the rest mode, the yoke 1520 reaches outward leaving the wheels 1450 at the distal ends of their respective races 1440 adjacent the panel's north and south edges. In the active mode, the yoke 1520 retracts to draw the wheels along their respective races 1440 to their proximal ends, closer to the center of the panel 1410. The yoke 1520 translates along direction arrows 1570. The actuator 1510 can optionally incorporate a helical spring or other tension device for inducing the yoke 1520 to extend in the rest mode. Such a tension device to restore the yoke 1520 to its rest position can be internal or external to the actuator 1510.

The wheels 1450 can freely rotate (or slide) within their respective races 1440 along direction arrows 1580 as the yoke 1520 transmits force from the actuator to pull or push the wheels 1450, which connect to their respective proximal members 1530 and 1540. By the actuator 1510 pulling the wheels 1450 inward, the scissors pairs 1460 extend upward from the panel 1410, being radially outward within the shell 1330. This movement translates the weight 1370 (relative to the panel 1410) away from the shell's center, enabling locomotion of the SWIFT 1310 by altering its moment of inertia in the direction of the weight's extension towards the shell's periphery. Extension and retraction of the scissors pairs 1460 is shown by the direction arrows 1380. Artisans of ordinary skill will recognize that the configuration shown for the scissors pairs 1460 and associated wheel assemblies 1430 is exemplary only for purpose of explanation and that alternate geometries can be contemplated without departing from the invention's scope.

Figure 16:
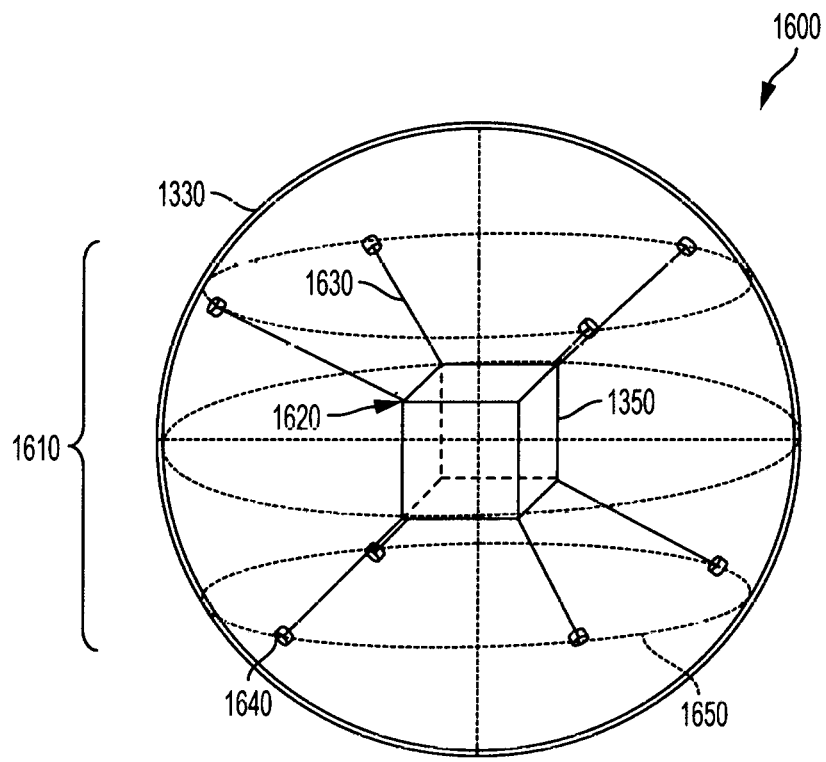
FIG. 16 is an internal isometric view of the tumbler assembly with attachments for a control cube.

FIG. 16 shows an isometric view 1600 of the SWIFT 1310 with the actuation box 1350. A mount assembly 1610 rigidly attaches the box 1350 to the spherical shell 1330. The corners 1620 of the box 1350 attach to mounting arms 1630 to avoid interference with the weights 1370 and the scissors pairs 1460. The arms 1640 attach securely to the inner surface of the shell 1330 at connect points 1640 designated by foot pads that extend around common latitude rings 1650. Thus, the box 1350 rolls in conformity with the shell 1330.

Figure 17:
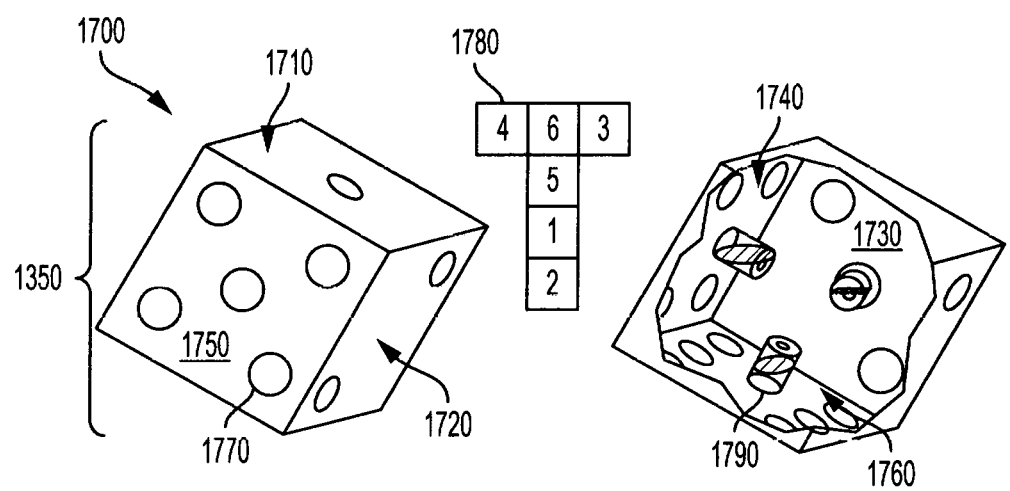
FIG. 17 is an isometric view of the control cube for the tumbler assembly.

FIG. 17 shows isometric views 1700 of the actuator box 1350, the left presenting an exterior, and the right illustrating a cut-away to reveal the interior. Each panel 1410 can be identified as a numbered face, as on a die. As an example, a first face 1710 on the outer left faces upward, a second face 1720 on the outer left faces downward, a third face 1730 on the inner right faces upward (slightly), a fourth face on the inner right faces upward, a fifth face 1750 on the outer left faces downward (slightly) and a sixth face 1760 on the inner right faces downward. The substantially perpendicular face arrangements are shown in flat T-format 1780 for a cubic die. The interior faces 1730, 1740 and 1760 feature orientation switches 1790 mounted to the interior surfaces of each panel 1410.

Figure 18:
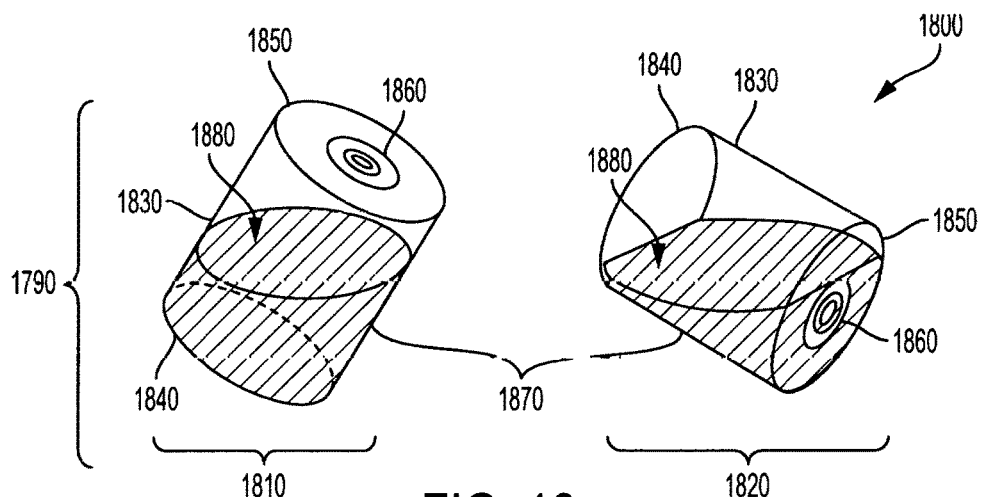
FIG. 18 is an isometric view of sensor switches.

FIG. 18 shows an isometric view 1800 of the orientation switches 1790. The first switch 1810 for the sixth face 1760 is shown on the left, and the second switch 1820 for the fourth face 1740 is shown on the right. Each switch 1790 includes a container 1830, depicted as cylindrical for this illustration, having proximal and distal ends 1840 and 1850 in relation to the panel 1410 onto which the switches 1790 attach. A gap contact 1860 is disposed at the distal end 1850.

The container 1830 is partially filed with a fluid conductor 1870, such as a liquid metal. Such a flowing metal can be mercury (Hg) or a eutectic alloy (as described for the SPARC 1110). A boundary surface 1880 separates the liquid metal 1870 from ullage volume. For the switch 1810 on a panel 1410 that faces downward, such as on face 1760, the metal 1870 settles towards the proximal end 1840, away from the contact 1860, leaving open any circuit connected thereto. For the switch 1820 on a panel 1410 that faces upward, such as on face 1740, the metal 1870 settles towards the distal end 1850, and thereby engages the contact 1860 to close any circuit connected thereto. As shown, the exemplary contact 1860 presents a circular disk with an annular divide that closes in the presence of the metal 1870, although this geometry is not limiting.

Figure 19:
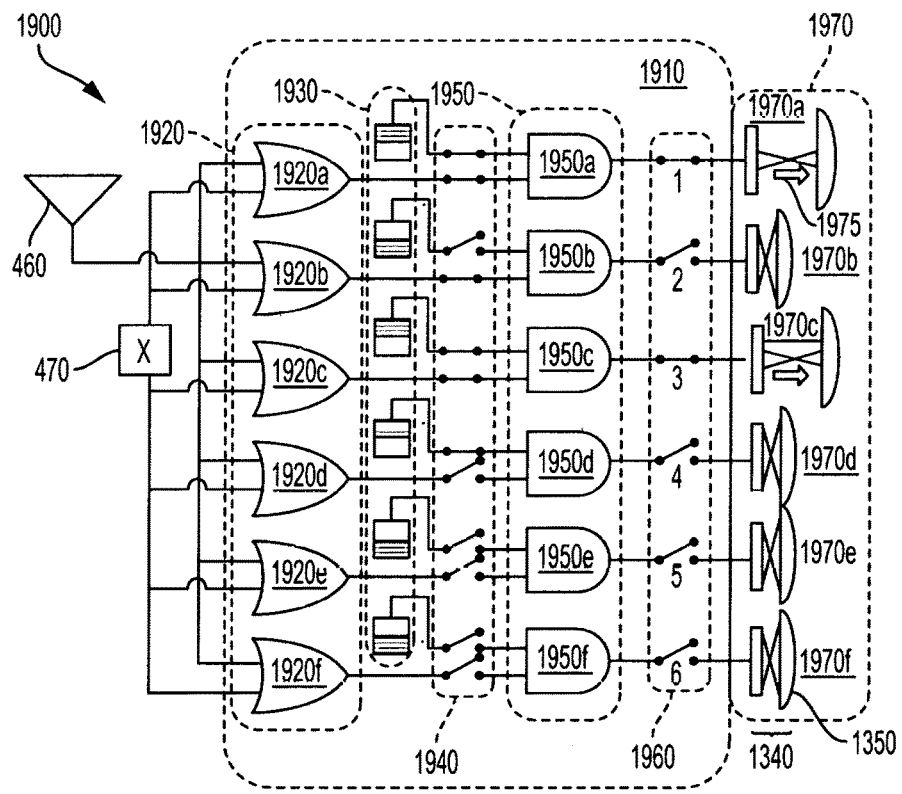
FIG. 19 is a schematic view of an assembly for actuation control.

FIG. 19 shows a schematic view 1900 of a logic structure 1910 for the processor 430 contained within the control cube 1330. The processor 1910 includes a series of .OR. gates 1920: 1920a for first face 1710, 1920b for second face 1720, 1920c for third face 1730, 1920d for fourth face 1740, 1920e for fifth face 1750, 1920f for sixth face 1760. The .OR. gates 1920 receive input signals from the receiver 460 and/or the accelerometer 470 to initiate a first actuation command, effectively as parallel circuits. A series 1930 of orientation switches 1790 that correspond to their respective faces provides a second actuation command. A series 1940 of switch positions represent exemplary settings for the first and second actuation commands. For each face (in ascending order from first at top to six at bottom) in the series 1940, an upper switch position corresponds to the associated orientation switch 1790, and a lower switch position corresponds to the associated command among the .OR. gates 1920.

For example, the first face 1710 is oriented upward (closed upper switch) and is directed by the gate 1920a (closed lower switch). By contrast, the sixth face 1760 is oriented downward (open upper switch) and is not directed by the gate 1920f (open lower switch). The settings from both upper and lower switches in the series 1940 are input to a series of .AND. gates 1950: 1950a for first face 1710, 1950b for second face 1720, 1950c for third face 1730, 1950d for fourth face 1740, 1950e for fifth face 1750, 1950f for sixth face 1760. The .AND. gates 1950 add the settings for setting a corresponding series 1960 of actuator switches, designated for each panel 1410 on the cube 1330, effectively as series circuits. The logical results from the .AND. gates 1950 (in the order of the first through sixth faces) yields settings of ON, OFF, ON, OFF, OFF, OFF for determining whether to extend a select scissors lift 1360 to radially extend the corresponding weight 1350 by retracting that particular actuator 1510.

Continuous rolling of the SWIFT 1310 along the surface 1320 involves coordinated sequencing of the scissors lifts 1360 in the propulsion assembly 1340. For a command direction and a corresponding upright face, the associated scissors lift 1360 extends the weight 1370. As the SWIFT 1310 rolls forward, the extending face orients downward, causing its lift 1360 to retract, and an adjacent upward oriented face in substantially the same command direction activates its lift 1360. For example, the T-format 1780 illustrates sequences for directions (relative to view 1700) on a cubic box 1350: upward 6-5-1-2, and starboard 3-6-4-1. Of course, input signals from the antenna 460 and/or the sensor 470 can alter the command direction. The tumbling nature of the SWIFT 1310 obviates any necessity for the GHoSt 480 or related device.

Artisans can also recognize that the embodiments described herein for the SMART configurations SEMITE and SPARC, as well as the SWIFT concepts are exemplary and not limiting with respect to particular dimensions. Advantages of the propulsive mechanisms for weight-shifting presented herein can be considered more amenable to miniature toy-size devices, whereas wheel traction designs in parent patents are expected to be more appropriate for larger platforms.

While certain features of the embodiments of the invention have been illustrated as described herein, many modifications, substitutions, changes and equivalents will now occur to those skilled in the art. The afore-described dimensions and mass properties constitute an example to demonstrate a practical utility and are not limiting. It is, therefore, to be understood that the appended claims are intended to cover all such modifications and changes as fall within the true spirit of the embodiments.

What is claimed is:

1. A spherical modular autonomous robotic traveler (SMART) for rolling along a surface from a first position to a second position, said SMART comprising:
    an outer spherical shell for rolling along the surface;
    an inner spherical chamber disposed within said outer shell, said chamber maintaining its orientation relative to the surface by a gyroscopically homing stabilizer (GHoSt);
    a plurality of weight-shifters arranged within said inner chamber, each weight-shifter including a mass disposed in a default position, and locatable to an active position in response to activation; and
    a controller within said inner chamber for selectively activating a weight-shifter among said plurality to shift said mass from said default position to said active position, wherein said outer shell rolls in a direction that corresponds to said weight-shifter activated by said controller.

2. The SMART according to claim 1, further comprising a lubrication layer interposed between said outer shell and said inner chamber.

3. The SMART according to claim 1, wherein said controller responds to an initiation signal from at least one of a receiver, an accelerometer and a timer.

4. The SMART according to claim 3, wherein said controller switches activation from a first weight-shifter to a second weight-shifter in response to said initiation signal.

5. The SMART according to claim 4, wherein said controller responds to an accelerometer within said chamber to shift from said first weight-shifter to said second weight-shifter.

6. The SMART according to claim 3, wherein said controller switches activation to several weight-shifters of said plurality in response to said initiation signal, such as upon reaching the second position.

7. The SMART according to claim 1, wherein said GHoSt includes counter-rotating flywheels to provide torque for counterbalancing tilt from activation of said weight-shifter.

8. The SMART according to claim 1, wherein said inner chamber comprises a lower dome that includes said plurality of weight-shifters and said controller, and an upper dome that includes a payload, said lower and upper domes being attachable together.

9. The SMART according to claim 8, wherein said lower and upper domes include honeycomb cells to structurally support said weight-shifters, controller and payload.

10. The SMART according to claim 1, as a spherical pneumatic actuated robotic commuter (SPARC), further comprising within said inner spherical chamber:
    a pneumatic reservoir containing a pressurized gas;
    a plurality of valves, each valve activated by said controller to open for releasing said gas, wherein
    each said weight-shifter includes a channel containing an armature of liquid material, said channel extending from said default position at bottom periphery of said inner chamber to said active position at lateral radial periphery of said inner chamber,
    said plurality of valves including a first access valve to said default position separately for each said channel in said plurality of weight-shifters, and a second access valve to said active position for all channels,
    said armature travels from said default position within corresponding said channel to said active position upon activation of associated said first access valve, and
    said armature returns from said active position to said default position upon activation of said second access valve.

11. The SPARC according to claim 10, wherein said pneumatic reservoir is carbon dioxide cartridge.

12. The SPARC according to claim 10, wherein said armature is mercury.

13. The SPARC according to claim 10, wherein said armature is eutectic galinstan alloy.

14. A spherical modular autonomous robotic traveler (SMART) for rolling along a surface from a first position to a second position as a spherical pneumatic actuated robotic commuter (SPARC), said SPARC comprising:
    an outer spherical shell for rolling along the surface;
    an inner spherical chamber disposed within said outer shell;
    a pneumatic reservoir containing a pressurized gas within said inner spherical chamber;
    a plurality of valves within said inner spherical chamber for controllably releasing said gas from said reservoir, said plurality of valves including a first access valve to said default position separately for each said channel in said plurality of weight-shifters, and a second access valve to said active position for all channels;
    a plurality of weight-shifters arranged within said inner chamber, each weight-shifter including a mass disposed in a default position, and locatable to an active position in response to activation such that said mass constitutes a channel containing an armature of liquid material, said channel extending from said default position at bottom periphery of said inner chamber to said active position at lateral radial periphery of said inner chamber; and a controller within said inner chamber for selectively activating a weight-shifter among said plurality to shift said mass from said default position to said active position by activating a select valve among said plurality of valves to open for releasing said gas, wherein said armature travels from said default position within corresponding said channel to said active position upon activation of associated said first access valve, said armature returns from said active position to said default position upon activation of said second access valve, and said outer shell rolls in a direction that corresponds to said weight-shifter activated by said controller.

15. The SPARC according to claim 14, wherein said chamber maintains its orientation relative to the surface by a gyroscopically homing stabilizer (GHoSt).

16. The SPARC according to claim 15, wherein said GHoSt includes counter-rotating flywheels to provide torque for counterbalancing tilt from activation of said weight-shifter.

17. The SPARC according to claim 14, wherein said pneumatic reservoir is carbon dioxide cartridge.

18. The SPARC according to claim 14, wherein said plurality of weight-shifters is arranged as a cruciform.

19. The SPARC according to claim 14, wherein said armature is mercury.

20. The SPARC according to claim 14, wherein said armature is eutectic galinstan alloy.

* * * * *